United States Patent [19]

Gjelsvik et al.

[11] 4,297,327

[45] Oct. 27, 1981

[54] METHOD OF PRECIPITATION OF PURE ALUMINIUMCHLORIDE FROM SOLUTIONS WHICH CONTAIN IONS OF ALUMINIUM AND MAGNESIUM

[75] Inventors: Norvald Gjelsvik, Oslo; Gunnar Hannestad, Skedsmo; Ingleif Hundere, Frogner; Jan H. Torgersen, Skjetten, all of Norway

[73] Assignee: Elkem-Spigerverket A/S, Oslo, Norway

[21] Appl. No.: 118,602

[22] Filed: Feb. 4, 1980

[30] Foreign Application Priority Data

Feb. 13, 1979 [NO] Norway .................................. 790458

[51] Int. Cl.³ .............................. C01F 7/22; C01F 7/30
[52] U.S. Cl. .................................... 423/126; 423/132; 423/495
[58] Field of Search ........................ 423/126, 495, 132

[56] References Cited

U.S. PATENT DOCUMENTS

| | | | |
|---|---|---|---|
| 558,725 | 4/1896 | Gooch | 423/126 |
| 1,656,769 | 1/1928 | Blanc | 423/126 |
| 1,701,510 | 2/1929 | Sieurin | 423/123 |
| 2,752,223 | 6/1956 | Reeve | 423/126 |
| 4,110,399 | 8/1978 | Gauderank et al. | 423/126 |
| 4,158,042 | 6/1979 | Deutschman | 423/126 |
| 4,177,242 | 12/1979 | Cohen et al. | 423/126 |

FOREIGN PATENT DOCUMENTS 1558347 10/1967 France .
1250178 10/1968 United Kingdom .
2013164 1/1979 United Kingdom .

*Primary Examiner*—Herbert T. Carter
*Attorney, Agent, or Firm*—Eyre, Mann, Lucas & Just

[57] ABSTRACT

Method of producing aluminiumchloride with a low content of magnesium from hydrochloric acid solutions which contain ions of aluminium and magnesium and from which the aluminiumchloride is precipitated by hydrochloric gas and where the precipitation is carried out continuously in cascade so that the major part of the aluminium will be precipitated from solutions in which the ratio between aluminium and magnesium calculated as g $Al^{+3}$/g $Mg^{+2}$ is above 0,5. Produced aluminiumchloride may be transformed to aluminiumoxide by calcination.

4 Claims, No Drawings

METHOD OF PRECIPITATION OF PURE ALUMINIUMCHLORIDE FROM SOLUTIONS WHICH CONTAIN IONS OF ALUMINIUM AND MAGNESIUM

Aluminium oxide which is to be used for production of metallic aluminium should be as pure as possible as several elements would otherwise impure the ready produced aluminium metal or cause difficulties during the production. Magnesium is such an unwanted element.

When aluminium oxide is produced from aluminiumchloride by thermic decomposition of the chloride, it has proved that the magnesium in the aluminiumchloride will be quantitatively recovered in the ready produced aluminiumoxide. In order to be able to produce from aluminiumchloride an aluminium oxide which is poor in magnesium it is necessary to be able to produce a chloride which is poor in magnesium. By production of aluminiumchloride from mineral raw material the latter has to be treated with hydrochloric acid whereby the contents of aluminium will be dissolved, and the undissolved remainders of the mineral can be removed for instance by filtration. Aluminiumchloride may be recovered from the aluminium-containing solution by addition of satisfactory amounts of hydrochloric acid gas which reduces the solubility of the aluminiumchloride so that it is precipitated as $AlCl_3 6H_2O$. In order to obtain an elevated yield by this precipitation the remainders of aluminium in the solution has to be as low as possible. It has then proved that magnesium in the solution will impure the precipitated aluminiumchloride.

The inventor has now found that it is possible to produce aluminiumchloride ($AlCl_3.6H_2O$) with a low content of magnesium from hydrochloric acid solutions which contain aluminium and magnesium iones by precipitation with hydrochloric acid gas, the precipitation being carried out continuously in cascade so that the major part of the aluminium will be precipitated from solutions in which the ratio aluminium/magnesium calculated as g $Al^{+3}$/g $Mg^{+2}$ is above 0,5. The produced aluminiumchloride is transformed to aluminiumoxide by calcination.

EXAMPLE

Anorthosite from Sogn (50% $SiO_2$, 30,5% $Al_2O$, 14,5% CaO, 0,5% MgO) was leached with hydrochloric acid which resulted in a solution containing 40 g $Al^{+3}$/l and 0,7 g $Mg^{+2}$/l. Hydrochloric acid gas was then supplied to the solution and there was precipitated an aluminiumchloride which contained 0,2% MgO in relation to its content of $Al_2O_3$. The chloride was dissolved in water and the solution was conducted continuously to a crystallizator to which hydrochloric acid gas was simultaneously supplied so that the aluminium concentration was kept constant at 25 g $Al^{+3}$/l. The solution from this crystallizator was conducted further to another crystallizator in which the aluminium concentration was maintained at 5 g Al/l by supply of hydrochloric acid gas. The precipitated crystals from these two crystallizators were collected and separated from the mother lye, washed with 36% hydrochloric acid in water and calcined to aluminiumoxide. The contents of MgO in this oxide was 0,03%.

The solution from the second crystallizator was conducted to a third crystallizator and the remaining contents of aluminium was precipitated by supply of additional amounts of hydrochloric acid gas. In this way the contents of aluminium was reduced to 0,2 g $Al^{+3}$/l. This resulted in an aluminiumchloride which was strongly impured by magnesium (0,6% MgO in $Al_2O_3$). This chloride was returned to solution and renewed precipitation.

It has thus been possible to procure a process which is continuous and also gives an acceptably pure product by carrying out the precipitation continuously in cascade so that when the solution passes through the cascade system, only a part of the aluminium contents will be precipitated in each cascade step. In this way the precipitation of the major part of the aluminium contents of the solution takes place at a relatively high aluminium concentration and gives a product which is only mildly impured by magnesium.

We claim:

1. A method of producing aluminium chloride hexahydrate with a low content of magnesium from hydrochloric acid solutions containing aluminium and magnesium comprising:
    (a) in a first step treating said solution with hydrochloric acid gas whereby aluminium chloride hexahydrate crystals are precipitated while the mother liquor solution maintains a ratio between aluminium and magnesium at a ratio above 0.5 for grams of $Al^{+3}$: grams of $Mg^{+2}$; and
    (b) separating the precipitated aluminium chloride hexahydrate crystals from the mother liquor;
    (c) in at least one second step transferring said mother liquor solution to a separate container, adding additional hydrochloric acid gas, and continuing to maintaining the ratio between said $Al^{+3}$ and said $Mg^{+2}$ above said 0.5 ratio, while continuing to precipitate further aluminium chloride hexahydrate crystals;
    (d) separating the further precipitated aluminium chloride hexahydrate crystals from the mother liquor; and
    (e) in a subsequent step precipitating substantially all remaining aluminium as aluminium chloride with additional hydrochloric acid gas and returning the precipitated aluminium chloride to solution and renewed precipitation.

2. The method of claim 1 wherein the concentration of aluminium in said first step is maintained at 25 grams per liter and the concentration of aluminium in the second step is maintained at 5 grams per liter.

3. The method of claim 1 wherein the aluminium chloride hexahydrate crystals from steps (b) and (d) are calcined to aluminium oxide.

4. The method of claim 1 wherein the concentration of aluminium in steps (a) and (c) is maintained at a constant level.

* * * * *